United States Patent Office 3,296,192
Patented Jan. 3, 1967

3,296,192
STABILIZATION OF POLYOLEFINS WITH NICKEL SALTS OF AROMATIC COMPOUNDS
Albert S. Matlack, Wilmington, Del., assignor to Hercules Incorporated, a corporation of Delaware
No Drawing. Filed Dec. 28, 1961, Ser. No. 162,977
8 Claims. (Cl. 260—45.75)

This application is a continuation-in-part of my application Serial No. 75,485, filed December 13, 1960, and now abandoned.

The present invention relates to polyolefin compositions and, more particularly, to the stabilization of polyethylene and stereoregular polymers of propylene and higher α-olefins against degradation by light.

Highly crystalline, high molecular weight polymers of ethylene, propylene and higher α-olefins are well known and have many established uses. However, one of the deficiencies of such polymers which must be overcome to enable their use in many applications is poor stability against the deleterious effect of light.

In accordance with the present invention it has been found that polyethylene and the stereoregular polymers of propylene and higher α-olefins can be stabilized very effectively against deleterious effects of light by incorporating in such polymers a small amount of nickel salt of an aromatic o-hydroxy compound having the formula

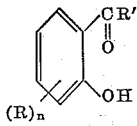

wherein R is selected from the group consisting of hydrogen, hydrocarbon and alkoxy radicals, R' is selected from the group consisting of hydrogen, hydroxyl and NR"R'" substituents wherein R" is selected from the group consisting of hydrogen and hydrocarbon radicals and R'" is selected from the group consisting of hydrogen, hydrocarbon and N(R")$_2$ radicals, and $n$ is a number from 0 to 4.

Although any polymer of a mono-α-olefin having at least 2 carbon atoms can be stabilized by means of the invention, the invention is particularly useful in stabilizing stereoregular polymers of monoolefins having from 3 to 6 carbon atoms including, for instance, polypropylene, poly(butene-1), poly(pentene-1), poly(3-methylbutene-1), and poly(4-methylpentene-1). Polyethylene, even though it degrades under the influence of light by a mechanism somewhat different than the above stereoregular polymers, is also susceptible to stabilization by the invention.

The nickel salts of aromatic o-hydroxy compounds used as additives in accordance with the invention increase the light stability of polyethylene, stereoregular polypropylene and related stereoregular polymers quite markedly. An even further increase in light stability can be achieved, however, by also incorporating a phenolic compound in the polymer. In fact, such outstanding light stability is obtained that it makes these stereoregular polymers usable for many applications requiring prolonged outdoor exposure.

The nickel salts that are used for the stabilization of stereoregular polymers in accordance with the invention have the formulae (1)

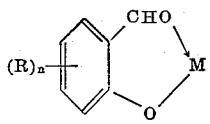

when R' is H, (2)

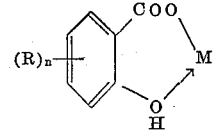

when R' is OH, and (3)

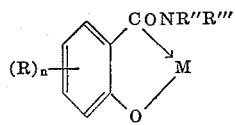

when R' is NR"R'", and R, R", R'" and $n$ are as previously defined and M is Ni/2 or NiOH. They can be made by methods known to the art. A convenient method for preparing the nickel salts of Formula 1 comprises reacting a salicylaldehyde with nickel acetate in dilute alcohol. Those of Formula 2 can be prepared by reacting salicylic acid with nickel hydroxide. The nickel salts of Formula 3 can be prepared by dissolving the desired salicylamide in an alcoholic solution ethoxide, adding an alcoholic solution of nickel chloride hexahydrate and removing the sodium chloride by filtration.

In the previously assigned formulae, the permissible R substituents are numerous and varied. Each R can be hydrogen, a hydrocarbon or an alkoxy radical, and the number of R substituents on the nucleus can vary from 0 to 4. Typical hydrocarbon radicals that the R substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical alkoxy radicals include methoxy, ethoxy, octyloxy, and decyloxy. R', as stated, may be hydrogen, in which case the nickel salt is that of an aromatic o-hydroxy aldehyde; it may be OH, in which case the nickel salt is that of an aromatic o-hydroxy acid; or it may be NR"R'", in which case the nickel salt is that of an N-substituted aromatic o-hydroxy amide. Typical hydrocarbon radicals that the R" and R'" substituent can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Specific o-hydroxy compounds from which the nickel salts can be prepared include salicylaldehyde, 5-tert-octyl salicylaldehyde, salicylic acid and N-dodecyl salicylamide.

The invention will be illustrated by the following examples in which parts and percentages are by weight unless otherwise specified.

*Example 1*

In this example stereoregular polypropylene having a birefringent melting point of about 168° C. and a reduced specific viscosity of 3.8 (measured on a 0.1% solution of decahydronaphthalene at 135° C.) was thoroughly blended with 0.5%, based on the amount of polypropylene, of the nickel salt of salicylaldehyde. The blend was extruded into molding powder at 210° C. and the molding powder was then pressed into sheets 25 mils thick. Strips cut from these sheets, and 0.5 inch wide, were fastened onto pieces of white cardboard and exposed to outdoor weathering in Miami, Florida, at a 45° angle facing south. During the outdoor exposure the development of brittleness in each strip was observed by periodically examining the strip and noting the time elapsed until it became brittle, the embrittlement point being the time elapsed until a strip breaks when bent double. Exposure data are as follows:

TABLE 1

| | Embrittlement Time |
|---|---|
| Control (no stabilizer) | 1 week. |
| Stabilized polymer | 1½ months (20,000 Langleys). |

*Example 2*

The same procedure as in Example 1 was followed except in this case the polymer additionally contained 0.5% of the reaction product of 2 moles of nonylphenol and 1 mole of acetone, the reaction product comprising a mixture of isopropylidene-bis(nonylphenol) and 2(2'-hydroxyphenyl)-2,4,4-trimethyl-5',6-dinonylchroman. The embrittlement time in outdoor exposure was increased to 2½ months (31,000 Langleys) by the addition of the phenolic ingredient.

*Example 3*

The nickel salt of 5-tert-octyl salicylaldehyde was evaluated in the manner of Example 2 in the amount of 0.5% and found to give an embrittlement time in outdoor exposure of about 4 months (greater than 40,312 Langleys).

*Example 4*

The nickel salt of salicylic acid was evaluated in the manner of Example 2 in the amount of 0.5% except that the embrittlement time was determined by exposure in a Fade-Ometer. Exposure data are as follows:

TABLE 2

| | Embrittlement time (hours) |
|---|---|
| Control (no stabilizer) | 24–48 |
| Stabilized polymer | 237 |

*Examples 5 to 7*

The nickel salt of N-dodecyl salicylamide, the basic nickel salt of N-dodecyl salicylamide and bis(salicylhydrazide) nickel dipyridinate were evaluated in the manner of Example 2 in the amount of 0.5% except that the embrittlement time was determined in a Fade-Ometer and/or Xeno-Tester by periodically examining the strip and noting the time elapsed until it became brittle, the embrittlement point being the time elapsed until a strip breaks when bent double. Table 3 shows the exposure data for this composition.

TABLE 3

| Example | Nickel Light Stabilizer | Embrittlement Time | |
|---|---|---|---|
| | | Fade-Ometer (Hours) | Xeno-Tester (Days) |
| Control | (Contains heat stabilizer but no nickel salt). | 24–48 | 7 |
| 5 | Nickel salt of N-dodecyl salicylamide. | 240 | 19 |
| 6 | Basic nickel salt of N-dodecyl salicylamide. | | 22 |
| 7 | Bis(salicylhydrazide)-nickel dipyridinate. | 188 | |

The amount of the nickel salt incorporated in the polymer can be varied from a very small amount up to several percent. More specifically, beneficial results are normally obtained when it is employed in an amount from 0.01% to about 5% by weight of the polymer.

As previously mentioned, one of the preferred but optional embodiments of the invention comprises incorporating into the polymer a phenolic compound in addition to the nickel salt. By this embodiment, the ability of the nickel salt to stabilize the polymer is synergistically enhanced to an even greater degree. The phenolic compound, when used, preferably comprises from 0.01 to 5% by weight of the polymer. Suitable phenolic compounds that are useful in this embodiment include polyalkylphenols, alkylidene-bis(alkylphenol)s, 2(2' - hydroxyphenyl) - 2,4,4 - polyalkylchromans, 4(2'-hydroxyphenyl)-2,2,4-polyalklchromans and adducts of an alkylphenol and a cyclic terpene.

The phenolic compounds used to produce the compositions of the invention are well known. The polyalkylphenols that can be used are either di- or trialkylphenols. Particularly preferred are the 2,4,6-trialkylphenols described in U.S. 2,581,907 to Smith, Jr., et al. Inclusive of such compounds are: 2,4-dimethyl-6-t-butylphenol, 2,4-dimethyl - 6(alpha,alpha,gamma,gamma, tetramethylbutyl)phenol, 2,6-di-t-butyl-4-methylphenol, 2-methyl-4,6-di-t-butylphenol, 2,6-di-t-butyl-4-sec-butylphenol, 2,4,6-tri-t-butylphenol, 2,4,6-triethylphenol, 2,4,6-tri-n-propylphenol, 2,4,6-triisopropylphenol, 2,6-di-t-octyl-4-propylphenol, 2, 6-di-t-butyl-4-ethylphenol, 2,4-dicyclohexyl-6-methylphenol, 2-isopropyl-4-methyl-6-t-butylphenol, 2,4-dimethyl-6-t-amylphenol, 2,4-di-t-amyl-6-methylphenol, 2,6-di-t-butyl-4-isopropylphenol, 2,6-di-t-amyl-4-methylphenol, 2,6-di-t-amyl-4-isopropylphenol, 2,4-diisopropyl-6-t-butylphenol, and 2,4-diisopropyl-6-sec-hexylphenol. The preferred compounds of this class are those which have secondary or tertiary alkyl groups at the 2- and 6-position and a normal alkyl group at the 4-position, a representative of this class being 2,6-di-t-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms. Any of the dialkylphenols are suitable; particularly preferred is the 2,6-di-t-butylphenol.

The second class of phenolic compound, the alkylidene-bis(alkylphenol), is characterized by the general formula

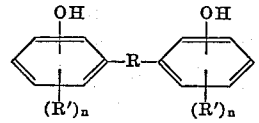

wherein R is an alkylidene radical of 1 to 5 carbon atoms and wherein R' is an alkyl group of 1 to 12 carbon atoms and $n$ is an integer from 1 to 3. When more than one R' substituent is present on a phenyl group, each R' can be the same or different.

Exemplary of these alkylidene-bis(alkylphenol)s that may be used are 2,2'-methylene-bis(5-isopropylphenol), 2,2' - methylene - bis(4 - methyl - 6 - isopropylphenol), 2,2' - methylene - bis(4 - methyl - 6 - t - butylphenol), 2,2' - methylene - bis(4 - t - butyl - 6 - methylphenol), 2,2' - methylene - bis(4,6 - di - t - butylphenol), 2,2'-methylene - bis(4 - nonylphenol), 2,2' - methylene - bis(4-decylphenol), 4,4' - methylene - bis(2,6 - di - t - butylphenol), 2,2' - isopropylidene - bis(5 - methylphenol), 4,4'-methylene - bis(2 - methyl - 6 - t - butylphenol), 2,2'-ethylidene - bis(4 - methyl - 6 - t - butylphenol), 2,2'-ethylidene - bis(4,6 - di - t - butylphenol), 2,2' - ethylidene-bis(4 - octylphenol), 2,2' - ethylidene - bis(4 - nonylphenol), 2,2' - isopropylidene - bis(4 - methyl - 6 - isopropylphenol), 2,2' - isopropylidene - bis(4 - isopropylphenol), 2,2' - isopropylidene - bis(4 - isopropyl - 6-methylphenol), 2,2' - isopropylidene - bis(4 - methyl - 6 - t - butylphenol), 2,2' - isopropylidene - bis(4 - octylphenol), 2,2' - isopropylidene - bis(4 - nonylphenol), 2,2' - isopropylidene - bis (4 - decylphenol), 2,2' - isobutylidene - bis(4 - methyl - 6-t-butylphenol), 2,2'-isobutylidene-bis(4-nonylphenol), 4, 4'-butylidene-bis(3-methyl-6-t-butylphenol), etc.

The 2(or 4)-(2'-hydroxyphenyl) chromans that may be used are those which have one of the following general formulae:

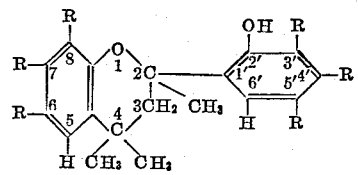

or

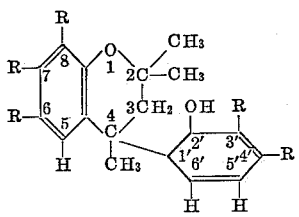

where each R may be hydrogen or alkyl, but at least one R in each of the aromatic rings is alkyl. These compounds may also be named as benzopyrans. Thus the 2(2'-hydroxyphenyl)chromans may be named as 2,3-dihydro-2(2'-hydroxyphenyl)-1,4-benzopyrans or 3,4-dihydro-2(2'-hydroxyphenyl)-1,2-benzopyrans and the 4(2'-hydroxyphenyl)chromans may be named as 2,3-dihydro-4(2'-hydroxyphenyl)-1,4-benzopyrans or 3,4 - dihydro-4(2'-hydroxyphenyl)-1,2 - benzopyrans. The 2(2'-hydroxyphenyl) chromans are also sometimes named as flavans, i.e., 2'-hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2(or 4)- (2'-hydroxyphenyl)chromans that may be used in combination with the nickel complexes are 2(2'-hydroxyphenyl)-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5',6-diisopropyl-2,4,4,3',8-pentamethylchroman,
2(2'-hydroxyphenyl)-5',6-di-t-butyl-2,4,4-trimethylchroman,
4(2'-hydroxyphenyl)-5',6-di-t-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)-5',6-didecyl-2,4,4-trimethylchroman, etc.

The alkylidene-bis(alkylphenol)s are prepared by any of the well-known procedures of the prior art. Usually they are prepared by reacting an alkylphenol with formaldehyde, acetaldehyde, acetone, or methyl ethyl ketone, etc., in the presence of a strong acid such as hydrochloric acid, etc. In a similar fashion the 2(2'-hydroxyphenyl) chromans are prepared by reacting an alkylphenol with acetone and the 4(2'-hydroxyphenyl)chromans are prepared by reacting an alkylphenol with mesityl oxide. Thus, in many of these reactions a mixture of alkylidene-bis(alkylphenol)s and (2'-hydroxyphenyl)chromans is obtained, as, for example, when acetone is condensed or reacted with an alkylphenol the reaction product may be a 2(2'-hydroxyphenyl)chroman or an isopropylidene-bis (alkylphenol), depending on the reaction conditions, or the reaction product may be a mixture of these two types of compounds. In such cases the individual compounds need not be isolated but instead the reaction product may be used with excellent results.

The terpene-phenol adducts that are used in accordance with the invention are known materials that have been described frequently in the prior art.

Generically defined, they are adducts of phenol or an alkylphenol that contains from 1 to 2 alkyl substituents of 1 to 10 carbon atoms each and a cyclic unsaturated terpene or dihydroterpene of empirical formula $C_{10}H_{16}$ or $C_{10}H_{18}$, respectively. They can be prepared by condensing phenol, or an alkylphenol, with the terpene, or dihydroterpene, in varying ratios in the presence of an acidic catalyst.

Suitable cyclic terpenes and dihydroterpenes from which the aforesaid adducts can be made include carvomenthene, dipentene, α-pinene, α-terpinene, terpinolene, 2-menthene, 3-menthene, dihydroterpinolene, dihydrodipentene, camphene, $\Delta^3$-carene, β-pinene and the like. Suitable phenols, in addition to phenol itself, include the various isomeric cresols, 2-4-xylenol and other isomeric xylenols, p-sec-butylphenol, p-isopropylphenol, o-isopropylphenol, m-isopropylphenol, o,o' - diisopropylphenol, o,o'-di-t-butylphenol, o-amylphenol, o-nonylphenol, and similar compounds.

The two reactants can be condensed in varying ratio. Any ratio within the range of 0.3 to 3 moles of terpene or dihydroterpene per mole of the phenolic compound is satisfactory, but it is preferred to employ a ratio within the narrower range of 0.5 to 2.5 moles of terpene or dihydroterpene per mole of the phenolic compound.

The adduct formation is carried out by contacting the two reactants in the presence of an acid catalyst at a temperature within the range of about 0 to 150° C. and allowing the reaction to proceed. An inert solvent may be used as a reaction medium for convenience if so desired. Normally the reaction will go to substantial completion in from 1½ to 5½ hours. Upon termination of the reaction, unconsumed reactants and volatile by-products can be removed by distillation at reduced pressure since the adducts themselves are high boiling materials.

The acid catalyst can be any of those acids or acidic compounds that are useful catalysts in condensation reactions generally. These include mineral acids such as sulfuric acid, organic acids such as p-toluene sulfonic acid, boron trifluoride and its derivatives, as, for instance, complexes of boron trifluoride and an ether, e.g., boron trifluoride—ethyl ether complex, metal chlorides such as aluminum chloride and stannic chloride, and acidic clays.

The terpene-phenol adducts are in all cases not a simple chemical compound but rather a mixture of compounds, principally phenolic ethers and terpenylated phenol. Thus, for instance, the adduct of 2 moles of camphene and 1 mole of p-cresol is a mixture of compounds in which mixture the principal ingredient is diisobornyl-p-cresol (the isobornyl radical being formed by isomerization of camphene) but which also contains lesser amounts of the isobornyl ether of p-cresol.

In the case of other terpenes, or dihydroterpenes, and other phenols, similar adducts are formed in which the proportion of ingredients will vary depending on the ratio of reactants and the catalyst employed. Consequently, the adducts employed in the invention are incapable of structural definition.

The stabilizers used in accordance with this invention may be admixed with the polyolefin by any of the usual procedures for incorporating a stabilizer in a solid material. A simple method is to dissolve the stabilizers in a low boiling solvent such as benzene or hexane and, after thoroughly mixing the solution with the polymer in flake or other such form, evaporating the solvent; or they may be incorporated by various means of mechanical mixing, etc.

In addition to the nickel salt and the phenolic compound, there may also be present compounds capable of decomposing peroxides, e.g., dilauryl thiodipropionate, dialkyldisulfides, zinc dialkyldithiocarbamates, zinc dialkyldithiophosphates, and the like, which help to improve the heat stability of the polymer. The stabilizers may also be used in combination with other stabilizers such as other ultraviolet light absorbers, antacids such as calcium soaps, or other antioxidants. Other materials may also be incorporated in the polymer, as, for example, pigments, dyes, fillers, etc.

What I claim and desire to protect by Letters Patent is:

1. A polyolefin selected from the group consisting of polyethylene and a stereoregular homopolymer of a mono-α-olefin having at least 3 carbon atoms containing as a light stabilizer therefor a small stabilizing amount of a nickel salt of an aromatic compound having the formula

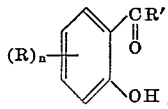

wherein R is selected from the group consisting of hydrogen, alkyl, aryl, cycloalkyl, aralkyl, alkaryl and alkoxy radicals, R' is selected from the group consisting of hydrogen, hydroxyl and NR"R'" substituents wherein R" is selected from the group consisting of hydrogen, alkyl, aryl, cycloalkyl, aralkyl, and alkaryl radicals and R'" is selected from the group consisting of hydrogen, alkyl, aryl, cycloalkyl, aralkyl, alkaryl and $N(R")_2$ radicals, and $n$ is a number from 0 to 4.

2. The composition of claim 1 in which the nickel salt is that of salicylaldehyde.

3. The composition of claim 1 in which the nickel salt is that of salicylic acid.

4. The composition of claim 1 in which the nickel salt is that of 5-tert-octyl salicylaldehyde.

5. The composition of claim 1 in which the nickel salt is that of N-dodecyl salicylamide.

6. The composition of claim 1 in which the nickel salt is bis(salicylhydrazide)nickel dipyridinate.

7. The composition of claim 1 containing also a small stabilizing amount of a phenolic compound selected from the group consisting of polyalkylphenols, alkylidene-bis(alkylphenol)s, 2(2' - hydroxyphenyl) - 2,4,4 - polyalkylchromans, 4(2' - hydroxyphenyl) - 2,2,4 - polyalkylchromans, and adducts of an alkylphenol and a cyclic terpene.

8. The composition of claim 1 in which the homopolymer is polypropylene.

References Cited by the Examiner

UNITED STATES PATENTS

| | | | |
|---|---|---|---|
| 2,481,307 | 9/1949 | Garner et al. | 260—45.75 |
| 2,615,860 | 10/1952 | Burgess | 260—45.75 |
| 2,985,617 | 5/1961 | Salyer et al. | 260—45.75 |
| 3,068,193 | 12/1962 | Havens et al. | 260—45.8 |
| 3,072,602 | 1/1963 | Clark et al. | 260—45.85 |
| 3,080,340 | 3/1963 | Havens et al. | 260—45.85 |
| 3,085,097 | 4/1963 | Strobel et al. | 260—45.85 |
| 3,125,597 | 3/1964 | Wahl et al. | 260—45.85 |
| 3,146,217 | 8/1964 | Gordon et al. | 260—45.85 |

FOREIGN PATENTS 946,039  12/1958  France.

DONALD E. CZAJA, *Primary Examiner.*

LEON J. BERCOVITZ, A. D. SULLIVAN,
*Examiners.*

G. W. RAUCHFUSS, A. H. KOECKERT,
*Assistant Examiners.*